(No Model.)

P. A. BOWEN & J. W. SUETTERLE.
BROOM SUPPORT.

No. 290,315. Patented Dec. 18, 1883.

Witnesses:

Inventors:
Phillip A. Bowen
John W. Suetterle
by Stout & Underwood
Attorneys.

UNITED STATES PATENT OFFICE.

PHILLIP A. BOWEN AND JOHN W. SUETTERLE, OF MILWAUKEE, WIS.

BROOM-SUPPORT.

SPECIFICATION forming part of Letters Patent No. 290,315, dated December 18, 1883.

Application filed June 26, 1883. (No model.)

*To all whom it may concern:*

Be it known that we, PHILLIP A. BOWEN and JOHN W. SUETTERLE, both of Milwaukee, in the county of Milwaukee, and in the State of Wisconsin, have invented certain new and useful Improvements in Holders for Handles of Brooms, Tools, &c.; and we do hereby declare that the following is a full, clear, and exact description thereof.

Our invention relates to devices for hanging brooms and other long-handled implements, and will be fully described hereinafter.

Figure 1:
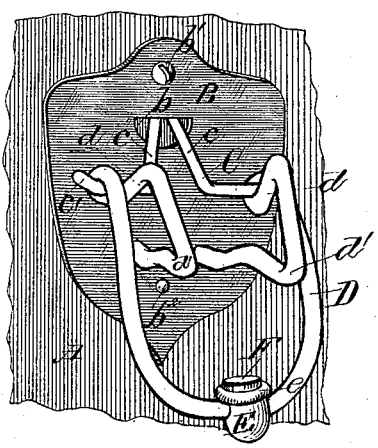
Figure 2:
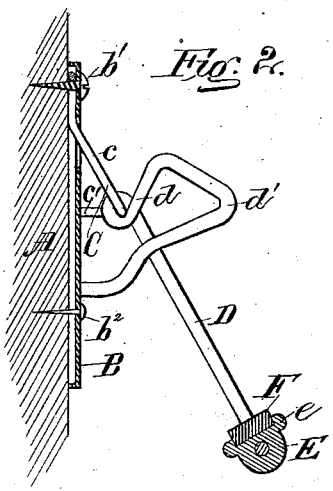
Figure 3:
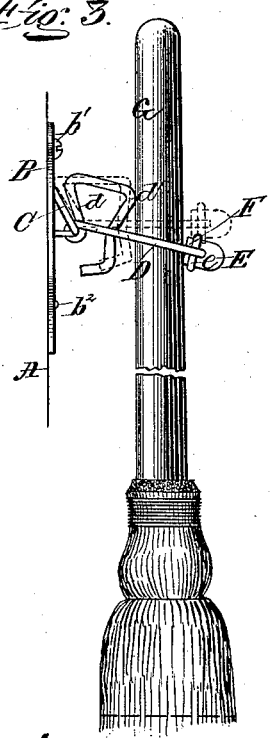
Figure 4:
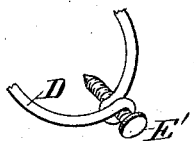
Figure 5:
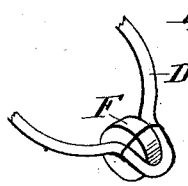

In the drawings, Figure 1 is a perspective view of our device. Fig. 2 is a central vertical section of the same. Fig. 3 is a side view, and Figs. 4 and 5 are details.

A is the wall of a room.

B is a shield that is to be secured to the wall by screws or nails $b'\ b^2$.

$b$ is an opening in the shield, through which we pass the bend $c$ of a hinging-wire, C, and this bend extends up far enough to receive the screw $b'$ as it is passed through the shield B into the wall, while the ends of the horizontal arms $c'$ abut against the outer face of the shield.

D is a hanging bail or loop, the arms $d\ d$ of which, after being bent around the hinging-wire, project up and out to form elbows $d'$, and then back and downward in position for their ends to abut against the plate B when the device is empty, as shown in Fig. 2. In its center the bail is provided with a lug, E, between the flanges $e\ e$ of which a rubber block, F, is secured, as shown in Fig. 2; or the bail may be recurved to form a bearing for a set-screw, E', as shown in Fig. 4, or it may be bent so as to clamp a rubber disk, as shown in Fig. 5, without departing from the spirit of our invention.

The operation of our device is as follows: When the bail is empty, it hangs in the position shown in Fig. 2, and when a handle, G, is thrust up into it, the handle, by impinging on elbows $d'$, will lift them, and with them lift a bail or loop to a horizontal, and will pass freely up through the bail until the pressure from below is removed, when the elbows $d'$ and block F will impinge upon the handle and securely hold it between them; but when the handle is to be withdrawn it is only necessary to press it toward the wall, forcing the elbows back into the position shown in dotted lines, Fig. 3, and this will cause the elbows and bail to release their hold and permit the handle to drop out.

We have shown our device as made principally of wire, but do not confine ourselves to this, as it might be made of either cast or wrought metal without departing from the spirit of our invention.

Having thus fully described our invention, what we claim as new, and desire to secure by Letters Patent, is—

1. In a device for suspending the handles of brooms and tools, the combination of a wall plate or shield and the hinging-wire C, bent upward to receive the screw or nail by which it is secured to the wall, and then bent outward and inward to form two arms, $c\ c'$, with the hanging bail or loop D, the arms $d\ d$ of which are wound around the arms $c'\ c'$ of the wire C, and are then bent downward and inward, forming elbows $d'\ d'$, the ends of which abut against the wall-plate when the device is not in use, and keep the device in position to receive the handle between the parts C and D, substantially as set forth.

2. The combination, in a handle-hanging device, of the hinging-wire C, the bail D, and the block or projection at the lower part of the said bail, substantially as set forth.

3. The described handle-hanging device, consisting of the shield B, perforated to receive the upper end of the hinging-wire C, which latter has arms $c'\ c'$, the bail D, secured, as described, to the arms $c'\ c'$ by its arms $d\ d$, which are extended beyond this point of union to form elbows $d'\ d'$, and the block or projection secured to the lower part of the bail D, substantially as set forth.

In testimony that we claim the foregoing we have hereunto set our hands, on this 23d day of May, 1883, in the presence of two witnesses.

PHILLIP A. BOWEN.
JOHN W. SUETTERLE.

Witnesses:
H. G. UNDERWOOD,
ROBERT DURR.